(12) United States Patent
Bathon et al.

(10) Patent No.: US 7,316,414 B2
(45) Date of Patent: Jan. 8, 2008

(54) HOUSING FOR AN AIRBAG MODULE

(75) Inventors: Petra Bathon, Sulzbach (DE); Andreas Hans, Niedernberg (DE); Hans-Martin Hauck, Rossdorf (DE); Takashi Sakaguchi, Mömbris (DE); Norbert Müller, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 11/418,460

(22) Filed: May 5, 2006

(65) Prior Publication Data

US 2006/0270261 A1 Nov. 30, 2006

Related U.S. Application Data

(63) Continuation of application No. PCT/DE2005/000269, filed on Feb. 15, 2005.

(60) Provisional application No. 60/545,172, filed on Feb. 18, 2004.

(30) Foreign Application Priority Data

Feb. 18, 2004 (DE) ..................... 10 2004 008 557
Oct. 20, 2004 (DE) ..................... 10 2004 051 434

(51) Int. Cl.
*B60R 21/203* (2006.01)
(52) U.S. Cl. .................. 280/728.2; 280/731
(58) Field of Classification Search ........... 280/728.2, 280/731
See application file for complete search history.

(56) References Cited

U.S. PATENT DOCUMENTS 3,819,205 A 6/1974 Dunford et al.
6,244,620 B1 * 6/2001 Bathon et al. ............. 280/731
6,659,498 B2 * 12/2003 Hirzmann ................. 280/731
6,675,675 B1 * 1/2004 Sauer et al. ................. 74/552
7,052,035 B2 * 5/2006 Kreuzer ................. 280/728.2
2002/0084634 A1 7/2002 Adomeit et al.
2002/0153708 A1 10/2002 Kreuzer
2002/0153714 A1 * 10/2002 Kreuzer .................... 280/731
2004/0017068 A1 * 1/2004 Weis et al. ................. 280/731
2005/0017484 A1 * 1/2005 Worrell et al. ............. 280/731

FOREIGN PATENT DOCUMENTS

| DE | 198 29 238 A1 | 1/1999 |
|---|---|---|
| DE | 199 27 024 A1 | 12/2000 |
| DE | 201 06 693 U1 | 9/2001 |
| EP | 0 523 882 A1 | 1/1993 |
| JP | 2002-362376 | 12/2002 |

* cited by examiner

*Primary Examiner*—Paul N. Dickson
*Assistant Examiner*—Joselynn Y. Sliteris
(74) *Attorney, Agent, or Firm*—Foley & Lardner LLP

(57) ABSTRACT

A housing for an airbag module for arranging on the steering wheel of a motor vehicle comprises a hinge mechanism for pivotably fixing the housing to a steering wheel and at least one fixing mechanism for additionally mounting the housing on the steering wheel in a floating manner. The hinge mechanism and the fixing mechanism are arranged at a distance from each other. The inventive housing also comprises a contact mechanism for triggering a vehicle horn. The contact mechanism is arranged at a distance from the hinge mechanism, and the housing mounted in a floating manner can be pivoted about the hinge mechanism in order to trigger the vehicle horn by applied pressure.

15 Claims, 5 Drawing Sheets

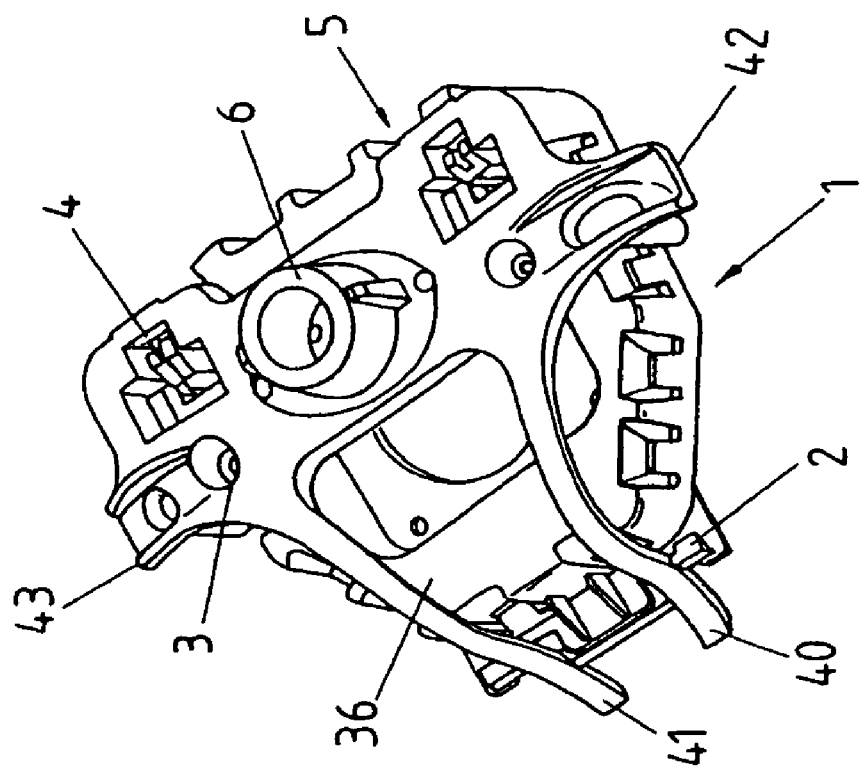
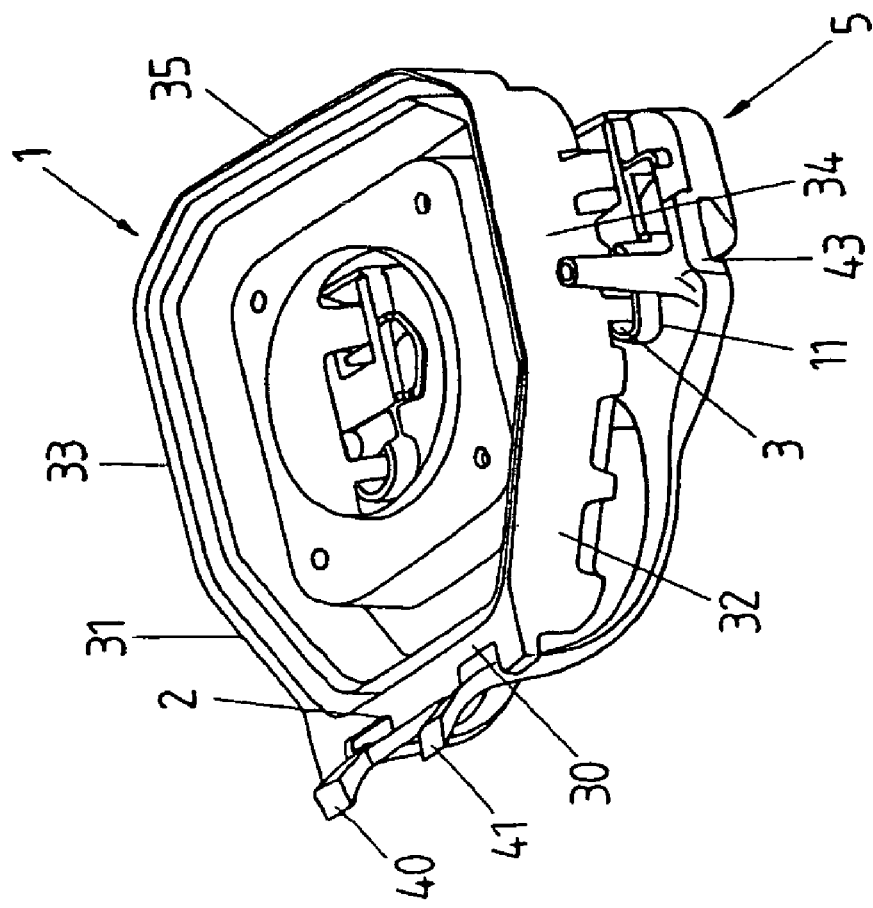

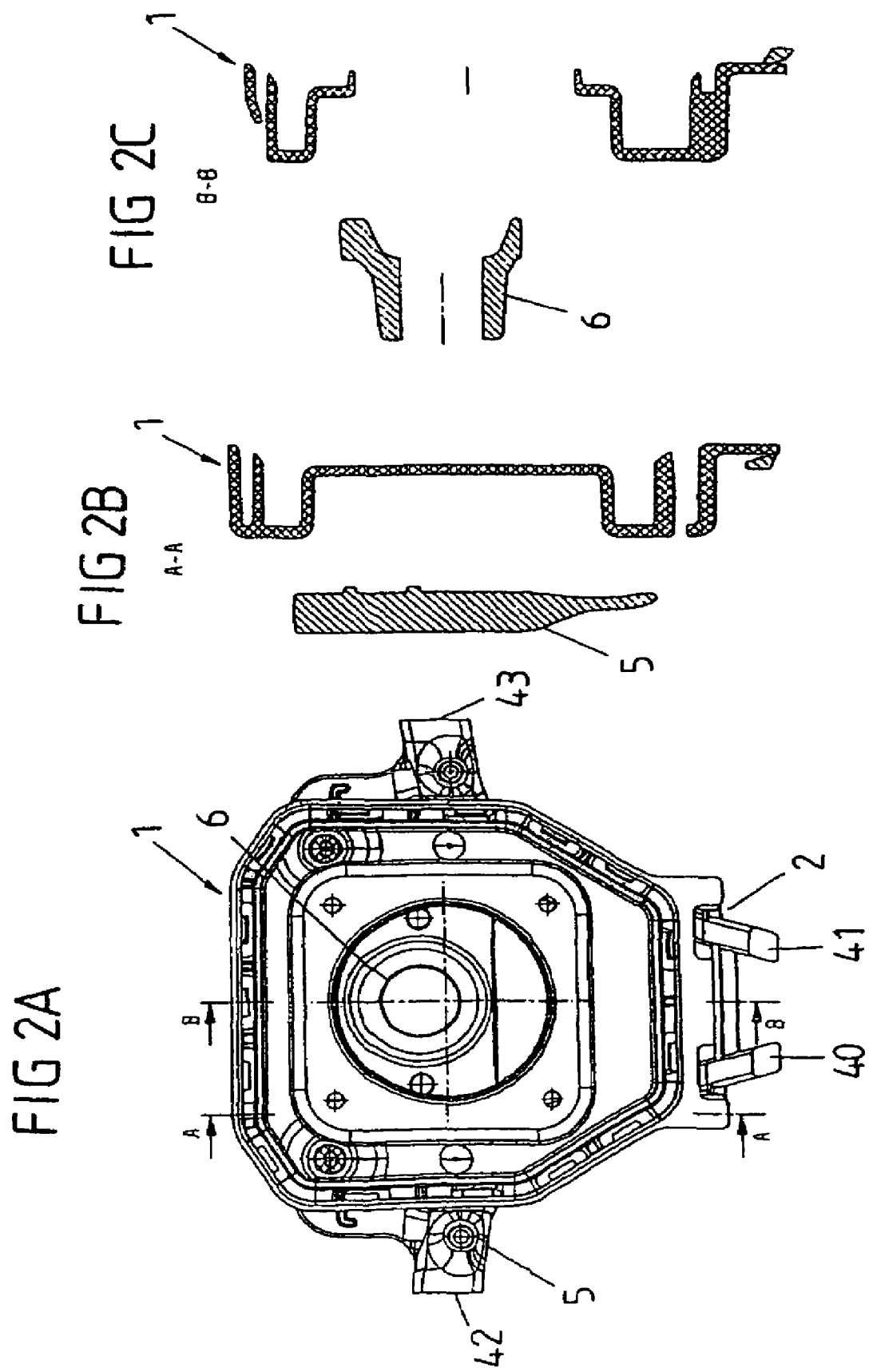

HOUSING FOR AN AIRBAG MODULE

CROSS-REFERENCE TO RELATED PATENT APPLICATIONS

This application is a continuation of PCT/DE 2005/000269, which has an international filing date of Feb. 15, 2005; this International Application was not published in English, but was published in German as WO 2005/080143.

BACKGROUND

The present application relates to a housing for an airbag module.

It is known to fasten airbag module housings in the center of the steering wheel skeleton by latching them into place. In order to trigger the vehicle horn, the housing is assigned a separate horn plate which is arranged in a floating manner, generally by mechanism of screws, in the center of the steering wheel skeleton. The vehicle horn is then triggered by pressure being applied to the housing, as a result of which the housing is deflected in the axial direction into the center of the steering wheel skeleton.

However, a disadvantage of these concepts is that both a large horn plate is required and at the same time the horn plate has to be moved in the axial direction to trigger the vehicle horn, which mechanism that the application force is high and the required actuating distance is relatively large.

SUMMARY

One embodiment disclosed herein relates to a housing for an airbag module for arranging on the steering wheel of a motor vehicle. The housing comprises: a hinge device to pivotably mount the housing on a steering wheel; a fastening device such that the housing includes a floating mount on the steering wheel, the hinge device and the fastening device being arranged at points of the housing that are spaced apart from each other; and a contact device to trigger a vehicle horn, the contact device is arranged at a point spaced apart from the hinge device. The housing is mounted in a floating manner being pivotable about the hinge mechanism in order to trigger the vehicle horn by pressure being applied. A centering device is provided to center the housing on the steering wheel. The floating mounting of the housing takes place by the fastening device and a spring element.

Another embodiment relates to a steering wheel for a motor vehicle. The steering wheel comprises a housing for an airbag module. The housing including: a hinge device to pivotably mount the housing on the steering wheel; a fastening device such that the housing includes a floating mount on the steering wheel, the hinge device and the fastening device being arranged at points of the housing that are spaced apart from each other; and a contact device to trigger a vehicle horn, the contact device is arranged at a point spaced apart from the hinge device. The housing is mounted in a floating manner being pivotable about the hinge mechanism in order to trigger the vehicle horn by pressure being applied. A centering device is provided to center the housing on the steering wheel. The floating mounting of the housing takes place by the fastening device and a spring element.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1A shows a perspective view of a housing arranged on a steering wheel for an airbag module as part of a device for actuating a vehicle horn.

FIG. 1B shows the arrangement according to FIG. 1A from the opposite side.

FIG. 2A shows a plan view of the housing for an airbag module, which housing is arranged on a steering wheel.

FIG. 2B shows a sectional view of the arrangement shown in FIG. 2A along the axis A-A.

FIG. 2C shows a sectional view of the device shown in FIG. 2A along the axis B-B.

DETAILED DESCRIPTION

Figure 3:
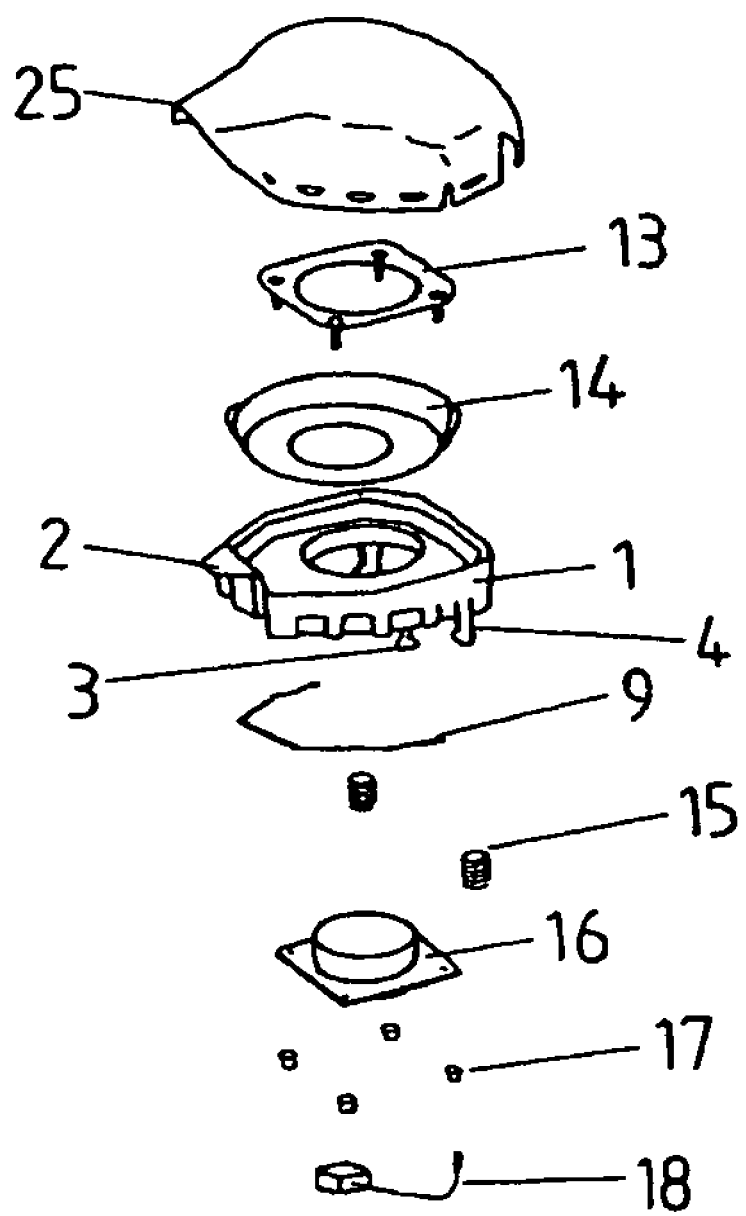
FIG. 3 shows an exploded drawing of a device to be arranged in the center of a steering wheel skeleton for actuating a vehicle horn.

As disclosed herein, a housing for an airbag module is provided. The housing serves to trigger a vehicle horn and may be distinguished by a compact construction and a short actuating distance.

A housing according to embodiments of the invention for an airbag module for arranging on the steering wheel of a motor vehicle provides at least one hinge mechanism for the pivotable fastening of the housing on a steering wheel and at least one fastening mechanism for the additional floating mounting of the housing on the steering wheel, the hinge mechanism and the fastening mechanism being arranged at points spaced apart from each other. Furthermore, according to embodiments of the invention, the housing has a contact mechanism for triggering a vehicle horn, which contact mechanism is arranged at a point spaced apart from the hinge mechanism, the housing mounted in a floating manner being pivotable about the hinge mechanism in order to trigger the vehicle horn by pressure being applied.

The housing, according to embodiments of the invention, realizes a compact construction by the contact mechanism being arranged directly on the housing, the triggering of a vehicle horn with a very short actuating distance and low pressure being applied by the driver of a vehicle, which in turn arises from the pivotability of the housing about the hinge mechanism. With the housing according to embodiments of the invention, an actuating distance of at most one millimeter, in particular 0.5 to 0.3 millimeter, can be realized for triggering the vehicle horn.

In an embodiment of the invention, the housing furthermore has at least one centering mechanism for centering the housing on the steering wheel. This ensures a stable arrangement of the housing according to embodiments of the invention on the steering wheel.

The hinge mechanism may be arranged on the spoke of a steering wheel, such as on a region of a steering wheel spoke that is adjacent to the steering wheel hub. Owing to the resultant short lever travel, this measure permits a short actuating distance for triggering the horn.

The fastening mechanism, which may be designed, for example, as a latching hook, is advantageously arranged in the region of the hub of the steering wheel. This permits a simple fastening of the housing in the region of the steering wheel hub by latching in an opening provided for it in the steering wheel.

The floating mounting of the housing is achieved by the fastening mechanism and at least one spring element. The fastening mechanism, which is designed as a latching hook, serves to fasten the housing to a steering wheel by latching it into place. At the same time, at least one spring element arranged between the housing and the steering wheel causes a force to be exerted which acts on the housing and the steering wheel in the opposite direction. This makes it possible for the operation of the horn to be carried out by the housing according to embodiments of the invention.

In an embodiment of the invention, the contact mechanism arranged on the housing is designed as a contact plate which can be arranged on that side of the housing which, in the installation position, faces the steering wheel hub. The contact plate may be of a horseshoe-shaped or U-shaped design, as a result of which the shape of the contact plate is matched to the shape of the housing. As a result, a reliable triggering of the vehicle horn is ensured.

The problem is also solved by a steering wheel for a motor vehicle with a housing according to embodiments of the invention for an airbag module. For the floating mounting of the housing on the steering wheel, the fastening mechanism of the housing engages in a latchable manner in an opening arranged in the region of the steering wheel hub, the housing resting on at least one spring element arranged in the region of the steering wheel hub.

The hinge mechanism is advantageously arranged on a steering wheel spoke in a region assigned to the steering wheel hub. The housing can therefore be pivoted about the hinge mechanism in the direction of the hub of the steering wheel by pressure being applied.

The one centering mechanism in the region of the steering wheel hub can likewise engage in a bearing element of the steering wheel in order to reduce the play of the housing.

The pivoting of the housing enables the contact plate arranged on the housing to be brought into contact with a horn cable arranged in the region of the steering wheel hub, to trigger the horn.

Embodiments of the invention will now be explained with reference to the drawings.

FIGS. 1A and 1B show a housing 1, which is arranged on a steering wheel 5, for an airbag module for arranging on the steering wheel of a motor vehicle, from opposite perspectives.

The shell-shaped housing 1 has a baseplate 36 with a laterally protruding edge which extends peripherally along the entire baseplate 36 and defines six side surfaces 30, 31, 32, 33, 34, 35. A first side surface 30 of the housing 1, on which two hinge mechanism 2 of the pivotable fastening of the housing 1 to a steering wheel 5 are arranged, is adjoined by two side surfaces running away from each other in a symmetrical manner, namely a second side surface 31 and a third side surface 32 which merge into a fourth 33 and fifth 34 side surface which, for their part, are connected by a sixth side surface 35 lying opposite and parallel to the first side surface 30.

The steering wheel 5 which is shown in FIG. 1A and on which the housing 1 is arranged has four spokes 40, 41, 42, 43, with in each case a first spoke 40 and a second spoke 41 being arranged essentially in what is referred to as the 6 o'clock position, i.e. essentially downward, pointing in the direction of a driver, in a position of the steering wheel 5 in the vehicle that permits the motor vehicle to travel straight ahead. A third spoke 42 (not visible in FIG. 1A) is arranged in the 10 o'clock position and a fourth spoke 43 is arranged in the 2 o'clock position.

It can furthermore be seen in FIG. 1A that the housing 1 for an airbag module is mounted pivotably on the first spoke 40 and second spoke 41 of the steering wheel 5 by mechanism of the hinge mechanism 2 arranged on the first side surface 30.

A respective centering mechanism 3 for centering the housing 1 on the steering wheel 5 is arranged on the opposite fourth side surface 33 and fifth side surface 34 of the housing 1. The respective centering mechanism 3 is formed here as a pin, with each pin engaging in a bearing element 11 arranged in the center of the steering wheel 5.

According to FIG. 1B, a fastening mechanism 4 for the floating mounting of the housing 1 on the steering wheel 5 is arranged at the bottom of the housing 1 in the region of the sixth side surface 35, said fastening mechanism being designed here as latching hooks 4 in combination with spring elements 15. After passing through an opening arranged in the center of the steering wheel 5, a respective latching hook 4 can be latched in a recess arranged on the lower side of the steering wheel 5. As a result, the housing 1 is arranged in the region of the hub 6 of the steering wheel 5 on that side of the steering wheel 5 which faces the driver of a motor vehicle.

The floating fixing of the housing 1 is produced by the arrangement of two spring elements 15 between the baseplate 36 of the housing 1 and the region of the hub 6 of the steering wheel 5 in the region of the housing 1, on which the latching hooks 4 are also arranged. The arrangement of the spring elements 15 will become clear further below with reference to FIG. 3.

FIG. 2A shows a plan view of the embodiment, already shown in FIG. 1, of a housing 1 for an airbag module, arranged on a steering wheel 5, with it being possible to see all four spokes 40, 41, 42, 43 of the steering wheel 5. It can furthermore be seen in the figure that the baseplate 36 of the housing has a round opening which is arranged over the hub 6 of the steering wheel 5. A gas generator for filling an airbag can be placed through this opening. The airbag can likewise be fastened to the housing 1, which can be gathered from FIG. 3.

Starting from FIG. 2A, FIG. 2B shows a sectional view according to the axis A-A and FIG. 2C shows a sectional view according to the axis B-B, i.e. through the steering wheel hub 6. FIGS. 2B and 2C make it clear that the housing 1 does not rest directly on the steering wheel 5. On the contrary, the housing 1 is mounted pivotably on the steering wheel 5 on the first and second spokes 40 and 41 and, owing to the floating mounting, can be deflected in the direction of the region of the hub 6 of the steering wheel 5 by pressure being applied.

FIG. 3 shows a device for actuating a vehicle horn in an exploded drawing with a housing 1 for an airbag module. When this device is assembled, an airbag 14 is placed with its inflow opening onto the central opening of the housing 1 and is fixed thereon by a retaining ring 13 using suitable fastening mechanism. The device is covered toward the driver by an upper covering 25.

A contact plate 9, horseshoe-shaped in this embodiment, is arranged on that side of the baseplate 36 of the housing 1 which is opposite the airbag 14. In this case, a respective lateral limb of the contact plate 9, on which a contact triggering the horn can be produced, extends from that side of the housing which has the hinge mechanism 2 in the direction of the fastening mechanism 4, formed as latching hooks 4, within an edge region of the baseplate 36 of the housing. The central region of the contact plate 9, which region connects the lateral limbs of the contact plate 9, is arranged on the baseplate 36 in the region of the hinge mechanism 2, i.e. in the region of the first side surface of the housing 1.

For the floating fixing of the housing 1 on the steering wheel 5, the housing 1 rests in the region lying opposite the hinge mechanism 2 on spring elements 15 in the form of horn springs which, for their part, rest in a central region of the steering wheel 5. As already described above, the housing 1 is latched in the center of the steering wheel 5 by the latching hooks 4. A gas generator 16 (preferably of single-stage design) for filling the airbag 14 in the event of a crash protrudes into the central opening of the housing 1 from the direction of the hub 6 of the steering wheel 5. This gas generator 16 is fastened to the steering wheel 5 by mechanism of at least one rivet 17. Furthermore, a current-carrying horn cable 18 for triggering the horn and protruding upward in the direction of the contact plate 9 is arranged in the central region of the steering wheel 5.

A pressure being applied by a driver of the motor vehicle to the upper covering 25 counter to the spring force produced by the spring elements 15 causes a pivoting deflection of the housing 1 about the hinge mechanism 2 in the direction of the central region of the steering wheel 5. As a result, the contact plate 9 which is arranged on the housing 1 is brought into contact by its lateral limbs with the current-carrying horn cable 18 and the vehicle horn is triggered.

Accordingly, the actual horn operation does not take place on the first spoke 40 and second spoke 41 of the steering wheel skeleton 5, which spokes are arranged in the 6 o'clock position, but rather in the essentially opposite region of the housing 1, in particular along the fourth side surface 33 and fifth side surface 34 of the housing 1 on which the contact plate 9 is arranged. The contact plate 9 comes into contact, by pressure being applied, with rivets 17 arranged and connected in the region of the hub 6 of the steering wheel 5, the rivets 17 being current-carrying by a connection to a horn cable 18.

After pressure has finished being applied, the contact is again interrupted by the resetting forces of the spring elements 15 and the resultant caused pivoting back of the housing 1 about the hinge mechanism 2 upward, i.e. in the direction of the driver of the motor vehicle, and the horn signal is extinguished.

With the above-described arrangement of the housing 1 at a small distance from the central region of the steering wheel 5 in which the horn cable 18 required for triggering the horn is arranged, the actuating distance necessary for triggering the horn can be reduced, since the lever travel can be minimized by the arrangement of the housing by mechanism of hinge mechanism. An actuating distance of less than one millimeter, in particular 0.5 to 0.3 millimeter, can therefore be obtained.

Figure 4:
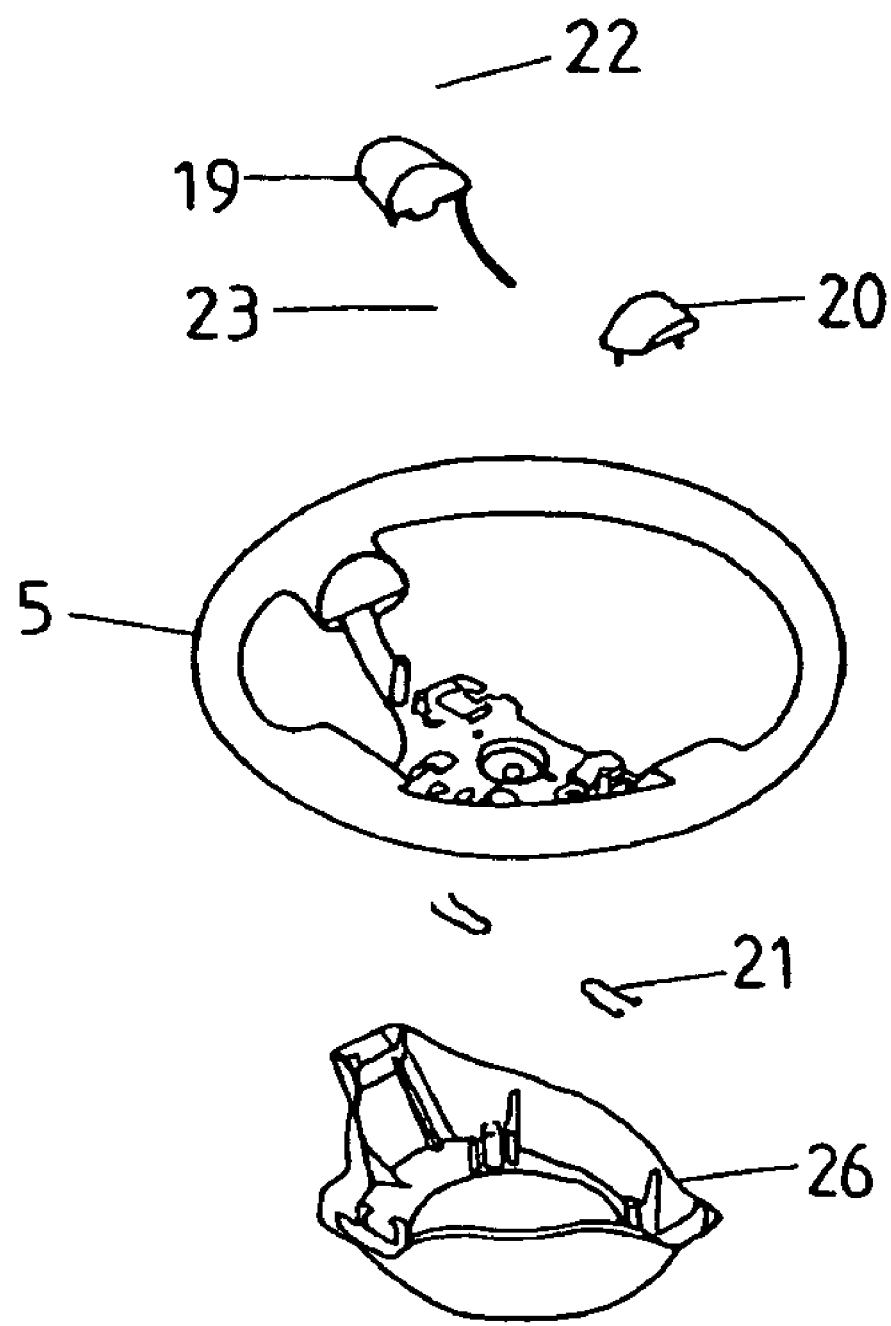
FIG. 4 shows a steering wheel skeleton in which a device for actuating a vehicle horn can be integrated together with a housing for an airbag module.

FIG. 4 shows a steering wheel skeleton 5, in the central region of which, after assembly, the device shown in FIG. 3 for actuating a vehicle horn can be installed. For this purpose, the device shown in FIG. 3 is fastened to the steering wheel 5 by mechanism of two retaining mechanism 21 which can be pushed laterally into an opening of the housing 1. The device is then covered in the direction of the longitudinal pillar by a lower covering 26.

To complete the steering wheel 5, then, in the case of the embodiment shown, both a multifunction switch 19 for operating diverse devices arranged in the motor vehicle and a spoke module 20 can be arranged on the upper side of the device by mechanism of screws 22, 23 with a steering wheel 5 which is suitable for installing in a motor vehicle then being present.

Figure 5:
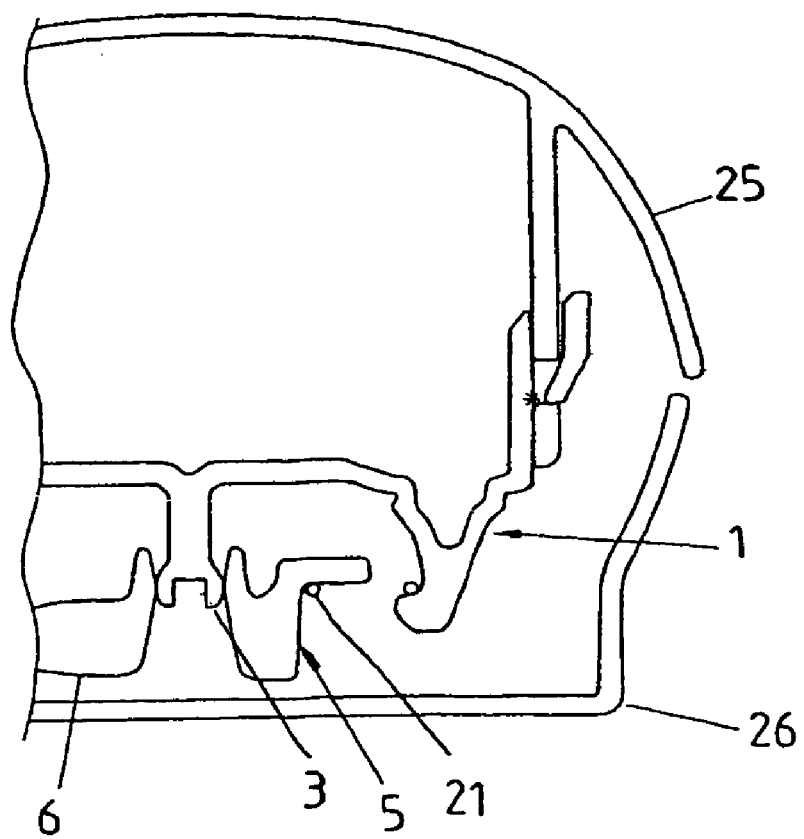
FIG. 5 shows a sectional view through a housing for an airbag module which is fitted in the center of a steering wheel skeleton.

A sectional view through a device fitted in a steering wheel 5 for actuating a vehicle horn with a housing 1 according to the invention is illustrated in a sectional view in FIG. 5. The housing 1 for an airbag module is centered on the steering wheel 5 by mechanism of a centering mechanism 3 in the form of at least one centering element, the centering mechanism 3 engaging in an opening arranged on the steering wheel hub 6. It can furthermore be seen that the housing 1 is fastened to the steering wheel 5 by mechanism of a retaining mechanism 21. The device for actuating a vehicle horn is surrounded by an upper covering 25 and a lower covering 26.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A housing for an airbag module arranged on a steering wheel of a motor vehicle, comprising:
    a hinge device for pivotably mounting the housing on the steering wheel;
    a fastening device for connecting the housing to the steering wheel, wherein the hinge device and the fastening device are arranged at points of the housing that are spaced apart from each other; and
    a contact device to trigger a vehicle horn, the contact device is arranged at a point spaced apart from the hinge device,
    wherein the housing is mounted in a floating manner and is pivotable about the hinge device in order to trigger the vehicle horn by pressure being applied, the housing is capable of only pivoting motion about the hinge device,
    wherein a centering device is provided to center the housing on the steering wheel, and
    wherein the floating mounting of the housing is provided by the fastening device and a spring element.

2. The housing as claimed in claim 1, wherein the fastening device is designed as a latching hook.

3. The housing as claimed in claim 1, wherein the contact device is designed as a contact plate.

4. The housing as claimed in claim 3, wherein the contact plate is arranged on a side of the housing which, in an installation position, faces the steering wheel hub.

5. The housing as claimed in claim 3, wherein the contact plate is of horseshoe-shaped design.

6. A steering wheel for a motor vehicle, comprising:
    a housing for an airbag module, the housing including:
        a hinge device to pivotably mount the housing on the steering wheel;
        a fastening device such that the housing includes a floating mount on the steering wheel, the hinge device and the fastening device being arranged at points of the housing that are spaced apart from each other; and a contact device to trigger a vehicle horn, the contact device is arranged at a point spaced apart from the hinge device, wherein the housing is mounted in a floating manner and is pivotable about the hinge device in order to trigger the vehicle horn by pressure being applied, the housing is capable of only pivoting motion about the hinge device, wherein a centering device is provided to center the housing on the steering wheel, and wherein the floating mounting of the housing is provided by the fastening device and a spring element.

7. The steering wheel as claimed in claim 6, wherein for the floating mounting of the housing on the steering wheel, the fastening device of the housing engages in a latchable manner in an opening arranged in a region of the steering wheel hub and the housing rests on at least one spring element arranged in a region of the steering wheel hub.

8. The steering wheel as claimed in claim 6, wherein the hinge device is arranged on a steering wheel spoke in a region of the steering wheel hub.

9. The steering wheel as claimed in claim 6, wherein the at least one centering device in a region of the steering wheel hub engages in a bearing element of the steering wheel.

10. The steering wheel as claimed in claim 6, wherein the housing is configured to be pivoted about the hinge device in a direction of the steering wheel hub by pressure being applied to the steering wheel.

11. The steering wheel as claimed in claim 6, wherein pivoting of the housing enables the contact device arranged on the housing to be brought into contact with a horn cable arranged in a region of the steering wheel hub, to trigger the vehicle horn.

12. The steering wheel as claimed in claim 6, wherein the fastening device is designed as a latching hook.

13. The steering wheel as claimed in claim 6, wherein the contact device is designed as a contact plate.

14. The steering wheel as claimed in claim 13, wherein the contact plate is arranged on a side of the housing which, in an installation position, faces the steering wheel hub.

15. The steering wheel as claimed in claim 13, wherein the contact plate is of horseshoe-shaped design.

* * * * *